S. CLAY.
SWIVEL JOINT FOR HOSE REELS.
APPLICATION FILED OCT. 1, 1912. RENEWED MAY 19, 1915.
1,166,579.
Patented Jan. 4, 1916.
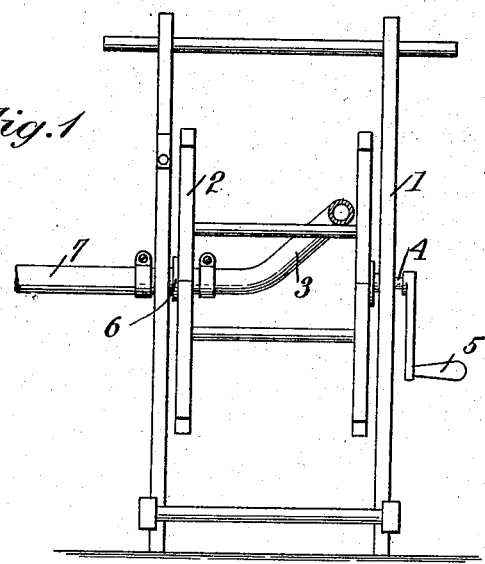
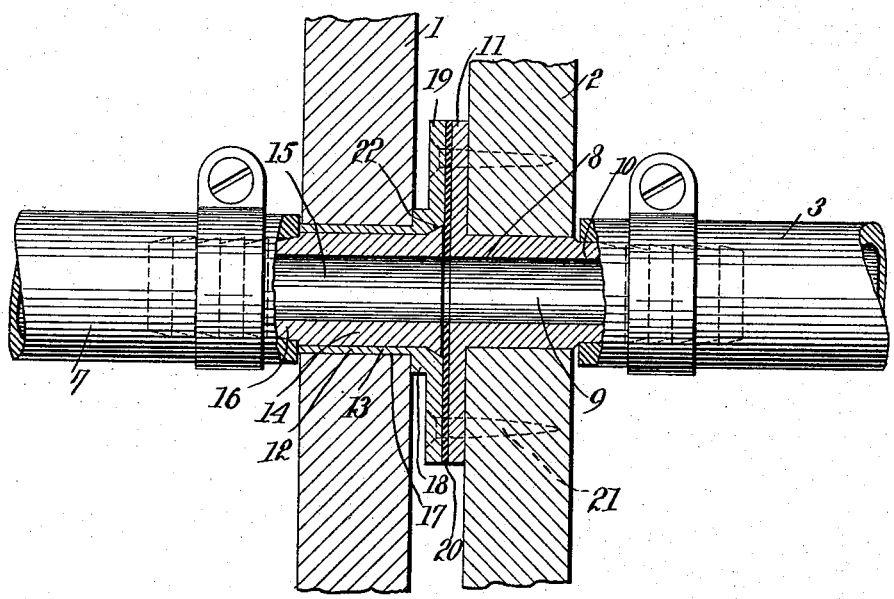
WITNESSES
INVENTOR
Samuel Clay,
BY
ATTORNEYS

UNITED STATES PATENT OFFICE.

SAMUEL CLAY, OF HANOVER, PENNSYLVANIA, ASSIGNOR OF ONE-HALF TO HARRY E. HOKE AND RALPH H. HOKE, BOTH OF HANOVER, PENNSYLVANIA.

SWIVEL-JOINT FOR HOSE-REELS.

1,166,579.  Specification of Letters Patent.  Patented Jan. 4, 1916.

Application filed October 1, 1912, Serial No. 723,287. Renewed May 19, 1915. Serial No. 29,215.

*To all whom it may concern:*

Be it known that I, SAMUEL CLAY, a citizen of the United States, and a resident of Hanover, in the county of York and State of Pennsylvania, have invented a new and Improved Swivel-Joint for Hose-Reels, of which the following is a full, clear, and exact description.

This invention relates to swivel joint hose connections and more particularly to a swivel joint, especially adapted for use in connection with hose reels to form one of the rotatable supports thereof, my object being to enable a hose reel to carry hose of varying lengths and thus permit the sprinkling operation to be accomplished with the use of a given length of hose without unwinding all of the same from the reel.

It is of some importance in the provision of mechanisms in this class that a simple, and yet efficient, structure be provided, and one which will stand considerable use, and the structure about to be set forth exemplifies such considerations.

Reference is to be had to the accompanying drawings forming a part of this specification, in which like characters of reference indicate corresponding parts in both the views, and in which—

Figure 1 is a side view of the reel; while Fig. 2 is a vertical sectional view showing the swivel coupling on which one end of the drum is mounted.

The construction shown embodies a hose reel made up of the usual frame 1 and drum 2 about which a length of hose 3 is adapted to be wound, the drum being mounted in the frame on one side by means of a stub shaft 4 on which is a crank handle 5, the other end of the drum being mounted in a swivel coupling 6 to which a line of hose 7 may be connected, which line of hose leads to a suitable water supply.

The swivel coupling is shown particularly in Fig. 2, and embodies parts movable relatively to each other, one of the parts being made up of two members suitably held together and turning with the drum, being fixed thereto. One of these members 8 has a passageway 9 extending therethrough, one end thereof being formed into a nipple 10 on which the hose 3 is secured, the other end being provided with a flange 11. The other member 12 has a passageway 13 extending therethrough of greater diameter than that of the passageway 9 before-mentioned, this passageway receiving the second part 14 of the coupling which has the passageway 15 extending therethrough, registering with the first-mentioned passageway 9; the outer end of this part 14 is formed into a nipple 16 on which the end of the hose 7 is adapted to be secured.

The frame 1 is provided with an opening 17 extending therethrough into which the said member 12 passes, there being a shoulder 18 on the member whereby the drum is properly positioned with respect to the frame. The said member 12 is provided adjacent its inner end with a flange 19 adapted to register with the flange 11 on the member 8, there being a suitable piece of packing 20 between these members, which are secured to the drum 2 by any suitable fastening means, such as screws 21. It will be obvious now that if the drum 2 is turned relatively to the frame 1 the members 8 and 12 will turn therewith; it is essential, however, that in order to permit such turning relatively to the part 14, and at the same time prevent separation of the parts, that some structure must be provided, and to this end the following preferred form has been adopted:—

The inner end of the part 14 is provided with a beveled peripheral shoulder 22, the inner end of the passageway 13 in the member 12 being countersunk, whereby the inclined wall of the shoulder 22 may closely engage in the said countersunk portion, which engagement, while permitting relative rotation of the parts, prevents separation thereof. The use of the packing 20 prevents leakage, this packing engaging the two flanges on the members 8 and 14, thereby tending to effectually prevent the passage of any water through the joint.

It is of course clear that many minor changes in the design and material of which the parts are made may be availed of without departing from the inventive idea, and that the size of the parts may be varied in order to provide suitable couplings adapted to hose reels of varying sizes.

Having thus described my invention, I claim as new and desire to secure by Letters Patent:—

A coupling especially adapted for use in connection with hose reels, comprising two parts movable with respect to one another, the first part consisting of an elongated member adapted for connection to a hose at one end and having a passage-way extending therethrough, and a flange at its opposite end, and another elongated member adapted to extend through a reel support and also having a passage-way extending therethrough and provided with a flange at one end and with an annular spacing shoulder adjacent said flange, packing material between the flanges of the said elongated members, fastening members for connecting said flanges and securing the same to a reel, the second part of the coupling comprising an elongated member extending through the second member of the first coupling part and having a passage-way and adapted for connection at one end to a hose, a beveled peripheral shoulder adjacent the flanged end of the said second member of the first coupling part, said second member of the first coupling part being provided with a counter-sunk portion into which the said shoulder engages, whereby when the members of the first part are secured to a reel, and the hose is placed in communication with the coupling parts, movement thereof is permitted whereby water may be conducted through the coupling, irrespective of the movement of the reel within its support.

In testimony whereof I have signed my name to this specification in the presence of two subscribing witnesses.

SAMUEL CLAY.

Witnesses:
C. M. WINEBRENNER,
H. E. HOKE.

Copies of this patent may be obtained for five cents each, by addressing the "Commissioner of Patents, Washington, D. C."